United States Patent [19]

Numakura et al.

[11] Patent Number: 5,014,120
[45] Date of Patent: May 7, 1991

[54] METHOD FOR PROCESSING PICTURE TO BE REPRODUCED ON COLOR PICTURE TUBE AND PROCESSOR THEREFOR

[75] Inventors: Takashi Numakura; Iwao Numakura, both of Tokyo, Japan

[73] Assignee: Yamatoya & Co., Ltd., Tokyo, Japan

[21] Appl. No.: 377,449

[22] Filed: Jul. 10, 1989

[30] Foreign Application Priority Data

Jul. 15, 1988 [JP] Japan ................... 63-175081

[51] Int. Cl.⁵ .............................. H04N 9/64
[52] U.S. Cl. ............................. 358/39; 358/32; 358/37; 358/169
[58] Field of Search ............. 358/32, 37, 39, 164, 358/169

[56] References Cited

U.S. PATENT DOCUMENTS

| | | | |
|---|---|---|---|
| 4,353,092 | 10/1982 | Bailey et al. | 358/169 |
| 4,450,482 | 5/1984 | Ackermann | 358/164 |
| 4,489,349 | 12/1984 | Okada | 358/32 |
| 4,654,710 | 3/1987 | Richard | 358/39 |
| 4,924,323 | 5/1990 | Numakura et al. | |

Primary Examiner—John W. Shepperd
Attorney, Agent, or Firm—Wenderoth, Lind & Ponack

[57] ABSTRACT

Disclosed herein is a method for processing a first picture to be reproduced on a color picture tube. The value $e_{ys}$ of luminance signal for a shadow S of a second picture, which has been obtained from a preceding scanning operation, is subtracted from the value $e_y$ of luminance signal for a desired pixel P out of video signals received, thereby determining the value $e_p$ of a base luminance signal. Luminance signal values $e_s$ and $e_h$ are set respectively for a shadow S and a highlight H among pixels of the first picture to be reproduced on the color picture tube. The value $e_q$ of a luminance signal for a pixel Q, which corresponds to the pixel P and is to be reproduced, is determined from the signal values $e_p$, $e_s$ and $e_h$ in accordance with a particular correction formula. The luminance of each pixel, which is to be reproduced on the color picture tube, is adjusted in accordance with the value $e_q$ of the corresponding luminance signal thus determined. A picture signal processor suitable for use in the practice of the method is also disclosed.

5 Claims, 8 Drawing Sheets

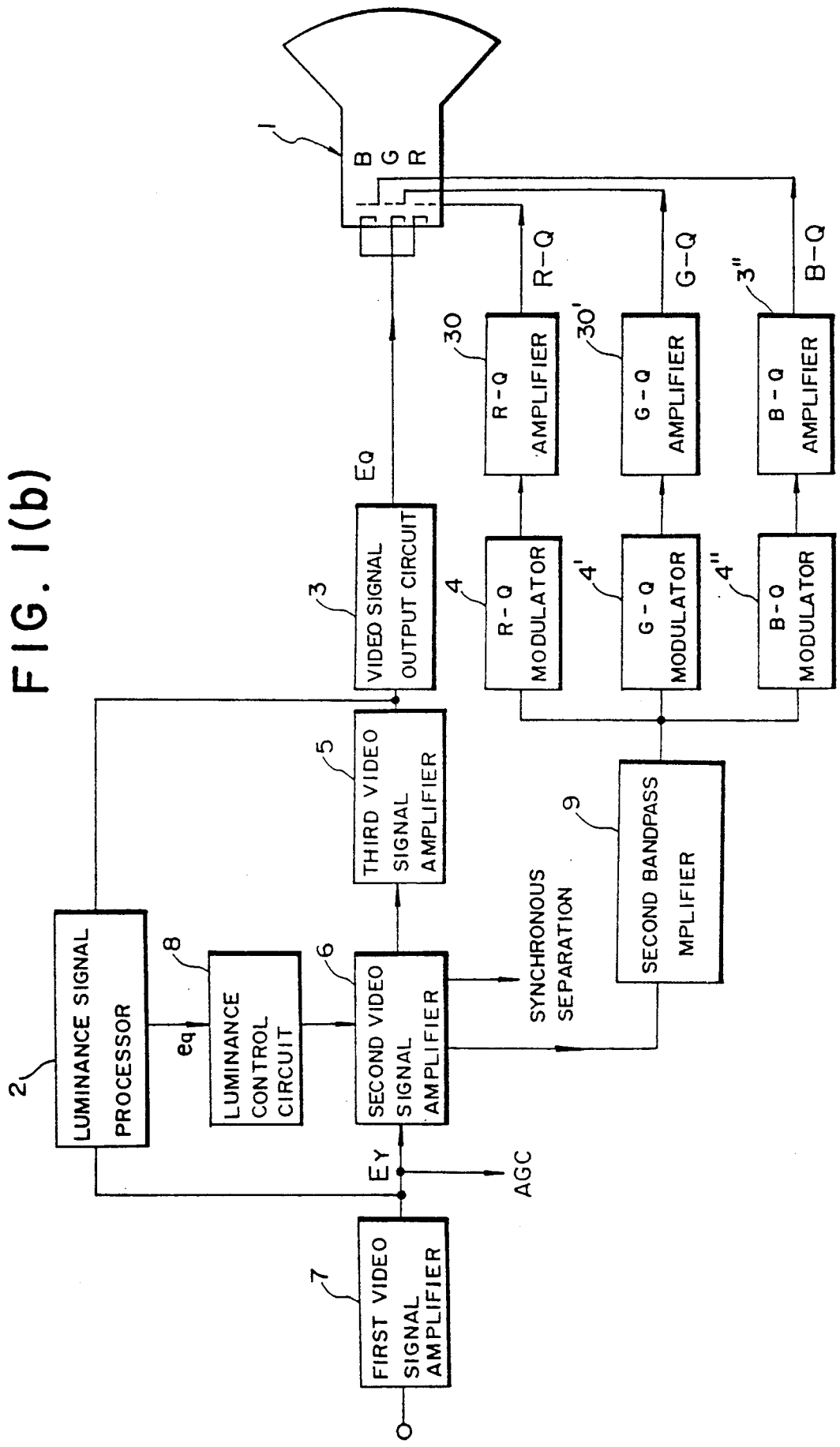

METHOD FOR PROCESSING PICTURE TO BE REPRODUCED ON COLOR PICTURE TUBE AND PROCESSOR THEREFOR

BACKGROUND OF THE INVENTION (1) Field of the Invention

This invention relates to a novel method for processing a picture to reproduce the picture with improved visibility on a color television receiver, and to a picture processor therefor.

(2) Description of the Related Art

Reference is first made to FIG. 3 which is a simplified block diagram of a transmission system for color television pictures. In a television camera 21, a multicolored light is received from an object through a lens 22 and the color of the object is separated into the three primary colors, i.e., red (R) light, green (G) light, and blue (B) light by use of a dichroic mirror unit 23. From these colors of light, primary color signals $E_R,E_G,E_B$ are then produced by image orthicon camera tubes 21R,21G,21B, respectively. A luminance signal $E_Y$, representative of the brightness of the picture, and color signals having information as to hue and saturation values are reproduced from the primary color signals by a matrix circuit 24 are then transmitted. The color signals which provide the primary color signals $E_R,E_G,E_B$ when combined with the luminance signal $E_Y$ are color difference signals $E_R-E_Y,E_G-E_Y, E_B-E_Y$. When such color difference signals are transmitted, the luminance signal $E_Y$ is added in the following manner at the reception side, thereby making it possible to reproduce the original primary colors.

$$(E_R-E_Y)+E_Y=E_R$$

$$(E_G-E_Y)+E_Y=E_G$$

$$(E_B-E_Y)+E_Y=E_B$$

As depicted in FIG. 4, the signals thus transmitted are received by an antenna 25. The desired channel is selected by a tuning circuit 26, so that the signals are amplified and converted into intermediate frequency signals. Video intermediate frequency (IF) signals which have been amplified at an intermediate frequency (IF) amplifier 27 are converted into video signals at a video signal detector 28. After amplification of the video signals at a video signal amplifier 29, the resulting signals are fed to a color picture tube 1. By electron beam scanning, a complete picture is formed from a series of video signals. Here, synchronizing signals transmitted along with the video signals are separated at a synchronous circuit 31 to control a horizontal and vertical deflection circuit 32, whereby the frequency and phase of the electron beam scanning are maintained consistent with those at the transmission side.

On the other hand, audio intermediate frequency (IF) signals are converted into audio FM signals at an audio signal detector and FM converter 33. The audio FM signals are converted further into audio signals by an FM detector 34 and a low frequency (LF) amplifier 35 and are then reproduced at a speaker 36.

The video signal amplifier 29 serves to amplify each luminance signal of the color television signals, which have been obtained at the video signal detector 28, to a level sufficient to activate the color picture tube 1. The video signal amplifier 29 is usually constructed of amplification circuits arranged in 3 to 5 stages and various auxiliary circuits.

To reproduce a color picture, the color picture tube 1 has to be fed with primary color signals. There are two types of manners for feeding these signals, i.e., the primary color drive system and the color difference drive system. FIG. 5 is a block diagram showing how primary color signals are produced and then fed to the color picture tube 1 in the primary color drive system. Primary color signals $E_R,E_G,E_B$ are applied at a negative polarity to respective cathodes 37-1,37-2,37-3 of the color picture tube 1, while respective first grids 38-1,38-2,38-3 are fed with a d.c. voltage.

The primary color signals are produced by adding the luminance signal and color difference signals at a matrix circuit 39. The matrix circuit 39 is inputted with the luminance signal $E_Y$ and color difference signals $E_R-E_Y,E_G-E_Y,E_B-E_Y$ and produces as outputs negative primary color signals $-E_R,-E_G,-E_B$. The negative primary color signals are then fed to the respective cathodes 37-1,37-2,37-3 of the color picture tube 1.

In the color picture tube 1, electron beams controlled by the primary color signals are caused to impinge exactly on color phosphors of red, green and blue colors, respectively, by way of a color sorting system, free of illustration, so that the phosphors are caused to glow to reproduce the color picture. The construction of the color picture tube 1 is illustrated in FIG. 6. The color picture tube 1 is basically constructed of three components, namely, an electron gun 61 for generating and directing electron beams, a shadow mask 62 for causing the electron beams to impinge only on phosphor dots of the designated colors, and a phosphor screen 63 coated precisely with red (R), green (G) and blue (B) phosphor dots in a predetermined pattern. Depending on differences in these components, color picture tubes can be classified into several types. Their details are however omitted herein.

Formation of a picture on a color picture tube is performed by left-to-right scanning (horizontal scanning) and up-to-down scanning (vertical scanning). The picture is successively and downwardly formed on the picture screen from the upper left corner. When the scanning has reached the lower right corner, the scanning returns again to the upper left corner. In this manner, 30 pictures, which are each divided into 525 lines, are formed per second. Accordingly, the horizontal scanning is repeated 15,750 times a second (525 lines × 30 pictures) while the vertical scanning is repeated 30 times.

However, interlaced scanning is used in actual scanning. As a result, the vertical scanning is repeated 60 times. As illustrated in FIG. 7(a) and 7(b), interlaced scanning is performed by first coarsely scanning at some intervals as indicated by numbers 1, 2, 3 and 4 and then scanning once more between the first scanning lines as indicated by numbers 5, 6 and 7. The scanning of an entire picture is brought to completion by only these two vertical scanning operations. When interlaced scanning is performed, two coarse pictures of 262.5 scanning lines are sent successively to form a picture of 525 scanning lines. It therefore appears as if 60 pictures are sent out, although 30 pictures are actually sent out per second. It is hence possible to obtain pictures of little flicker.

As has been described above, the conventional television receivers have reached a technical level which is satisfactory from the practical viewpoint. It is, however, now strived to improve the dissolution further, for example, by increasing the number of scanning lines to 650 or 700 lines per screen or converting the signal processing circuits into their digital counterparts. In addition, high-definition television receivers have also been developed, as future television receivers, for commercial use.

OBJECTS AND SUMMARY OF THE INVENTION

The present inventors have the following belief with respect to improvements in the picture quality of color television receivers. In spite of the various ingenious efforts exercised so far toward improvements in the picture quality of color television receivers, the characteristics of a picture as sensed by the human eyes, for example, the gradation, color tone, sharpness and contrast of the picture are still insufficient, leading to the demand for still better reproducibility of pictures.

In order to meet this demand, it is an object of this invention to provide a method for processing a picture, which is to be reproduced on a color picture tube, so as to reproduce the gradation and color tone of the original picture as an object which is naturally appealing, and also to provide an apparatus therefor.

In one aspect of this invention, there is thus provided a method for processing a first picture to be reproduced on a color picture tube, which includes:

(i) subtracting the value $e_{ys}$ of a luminance signal for a shadow S of a second picture, which has been obtained from a preceding scanning operation, from the value $e_y$ of luminance signal for a desired pixel P out of video signals received, thereby determining the value $e_p$ of a base luminance signal;

(ii) setting luminance signal values $e_s$ and $e_h$ respectively for a shadow S and a highlight H among pixels of the first picture to be reproduced on the color picture tube;

(iii) determining the value $e_q$ of a luminance signal for a pixel Q, which corresponds to the pixel P and is to be reproduced, from the signal values $e_p$, $e_s$ and $e_h$ in accordance with the following correction formula:

$$e_q = e_s + \frac{\alpha(1 - 10^{-ke_p})}{\alpha - \beta}(e_h - e_s)$$

wherein k, $\alpha$ and $\beta$ are factors for contrast adjustment and k and $\beta$ are correlated as follows:

$K = \gamma/(e_h - e_s)$ $\beta = 10^{-\gamma}$ $\gamma$ = desired factor; and (iv) adjusting the luminance for each pixel, which is to be reproduced on the color picture tube, in accordance with the value $e_q$ of the corresponding luminance signal thus determined.

In another aspect of this invention, there is also provided a picture signal processor for a picture reproduction apparatus of a color television receiver, the picture reproduction apparatus having a color picture tube, a matrix circuit for detecting a primary color signal from a first luminance signal and a color difference signal and circuitry for feeding an output from the matrix circuit to a color picture tube. The picture signal processor comprises:

a luminance signal processor (2) for computing the value of a second luminance signal for a pixel Q which corresponds to a desired pixel P out of the video signals received and is to be reproduced; and a luminance control circuit (8) for controlling, in accordance with the thus-computed value, the luminance of the corresponding pixel to be reproduced on the color picture tube.

In a preferred embodiment, the luminance signal processor includes:

an A/D converter for converting the first luminance signal;

a first storage circuit for luminance signals of individual pixels of a picture obtained from a preceding scanning operation;

a first detector for detecting the value $e_{ys}$ of the luminance signal for a shadow in contents stored in the first storage circuit;

a second storage circuit for corrected luminance signals of the individual pixels of the picture obtained from the preceding scanning operation, said corrected luminance signals having been fed subsequent to processing thereof;

a second detector for detecting the value $e_h$ of luminance signal for a highlight and the value $e_s$ of luminance signal of a shadow in contents stored in the second storage circuit;

a processor for subtracting the value $e_{ys}$ of the luminance signal for the value $e_y$ of the luminance signal for a desired received pixel P to compute the value $e_p$ of a base luminance signal and then computing the value $e_q$ of a luminance signal for a pixel Q, which corresponds to the desired pixel P, has been corrected in accordance with the above correction formula; and a D/A converter for converting the value $e_q$, which has been outputted from the processor, into an analog signal.

According to this invention, a gradation control technique developed for the formation of reproduced pictures, such as color-printed pictures, having excellent reproduction in gradation has been applied to the gradation control of a color television receiver which reproduces a color picture by producing the three primary colors of light, namely, red, green and blue colors. As a result, the gradation and color tone of a picture as an object can be reproduced in a naturally visually appealing manner as observed upon formation of reproduced pictures such as color-printed pictures, thereby making it possible to obtain high-quality pictures on color television receivers. This is readily understood from the fact that the correction formula employed in this invention has been derived from the density formula (optical density), $D = \log I_o/I$ in which $I_o$ denotes the intensity of incident light and I stands for the intensity of light reflected or transmitted. The density formula has been accepted widely.

BRIEF DESCRIPTION OF THE DRAWINGS

FIG. 1(b) is a block diagram of a picture signal processor according to another embodiment of this invention, as applied to the color difference drive system;

DETAILED DESCRIPTION OF THE INVENTION AND PREFERRED EMBODIMENTS

Figure 1A:
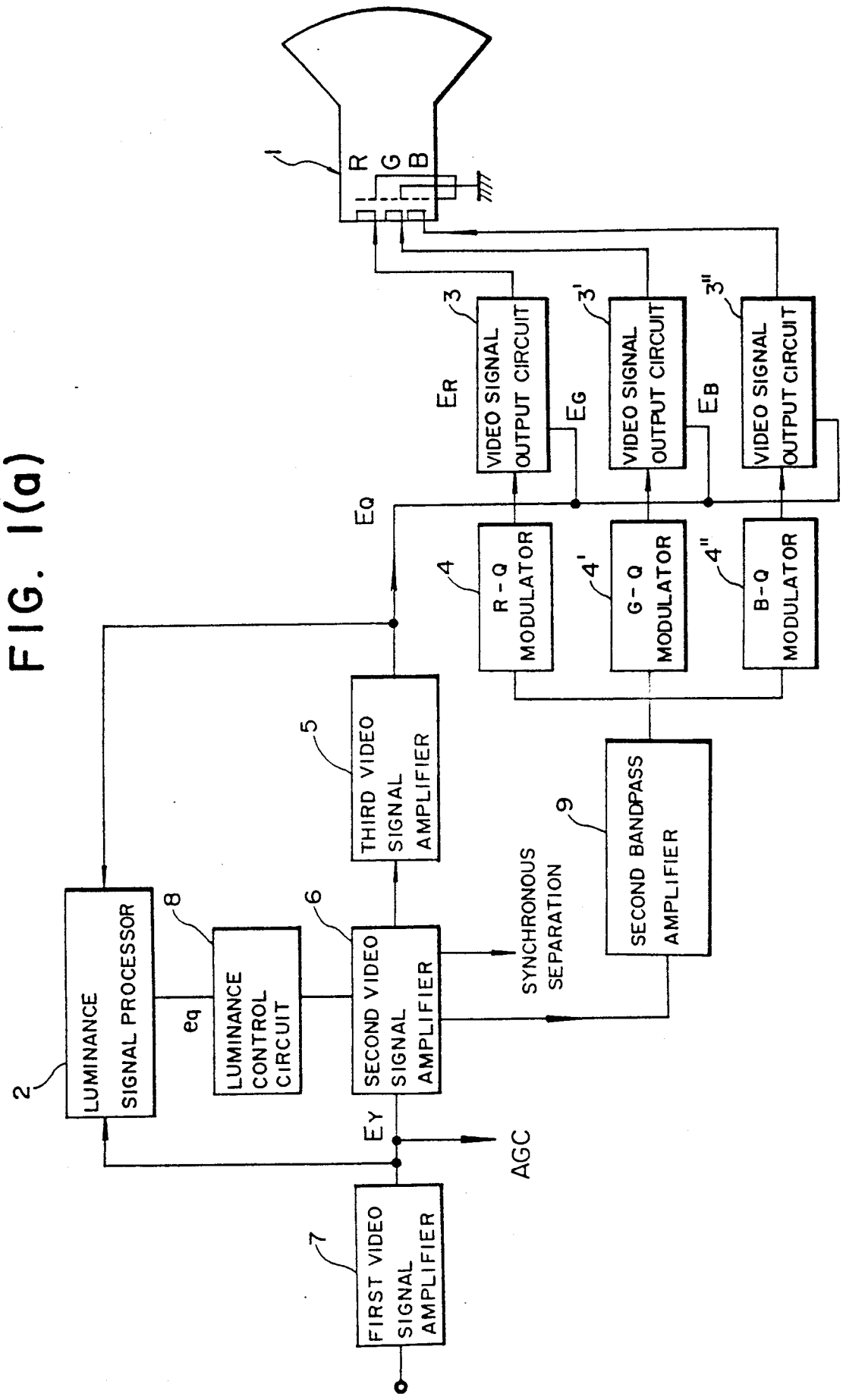
FIG. 1(a) is a block diagram of a picture signal processor according to one embodiment of this invention, as applied to the primary color drive system.

The correction formula, which constitutes the central feature of the picture processing method of this invention, will first be described.

The correction formula has been derived by developing the tonal conversion formula, which has already been proposed by the present inventors and is useful upon formation of reproduced pictures such as printed pictures, for pictures of luminance signals.

As is known well, the conversion of a continuous tone into a halftone is required when a print of a halftone is formed from an original picture of a continuous tone such as a color photograph. This tonal conversion is heavily dependent on the experiences and perception of the operator. Under the circumstances, it is hence difficult to efficiently produce prints with excellent reproduction of gradation and color tone.

The present inventors have already proposed a novel tonal conversion formula, which allows the performance of tonal conversion in a scientific and rational manner upon formation of reproduced pictures such as prints (see U.S. patent application Ser. Nos. 166,101 and 167,090 filed Mar. 9 and 11, 1988, respectively; European Patent Application Nos. 88 302 094.3 and 88 302 097.6). To facilitate the understanding of the present invention, the tonal conversion formula will be described in short.

It is necessary for the production of a print to pay attention to the fact that the quality of tonal conversion of an original picture directly affects not only the quality of gradation of a printed picture as a halftone picture but also the quality of its color tone. Accordingly, it is always desired to obtain a printed picture having a visually natural gradation and color tone under any circumstances by relying upon a tonal conversion formula which rationally correlates the density of a desired sample point on the original picture of a continuous tone with the dot area (dot area percentage) of the corresponding sample point on the resulting printed picture as a halftone.

By determining the base density x of a desired sample point (X) selected as a control point on an original picture (the density value obtained by subtracting the density of the brightest area, i.e., highlight H on the original picture from the density of the sample point) and choosing desired dot area percentages $(y_h, y_s)$ for the smallest and largest dots of the highlight H and the darkest area, i.e., shadow S on a desired halftone picture (printed picture), the present inventors therefore derived the following tonal conversion formula, which can determine the dot area percentage (y) of a sample point (Y) on a halftone picture (printed picture), the sample point (Y) corresponding to the desired sample point (X) on the original picture. The above patent applications may be referred to for the details of derivation of the following tonal conversion formula.

Tonal conversion formula $$y = y_h + \frac{\alpha(1 - 10^{-kx})}{\alpha - \beta} (y_s - y_h)$$

where $\alpha$: the surface reflectivity of a base material on which a reproduced picture is to be formed, such as a paper sheet;

$\beta$: the surface reflectivity of a visualizing medium for the reproduced picture, such as an ink; and k: the ratio of the density range of the reproduced picture to the density range of the original picture.

Use of the above tonal conversion formula will hereinafter be described assuming that the formation of a reproduced picture is practiced by use of an electronic color separation apparatus (scanner), the most general plate-making apparatus.

For the production of an original plate for a printed picture as a halftone picture, namely, an original printing plate, a system which is well-known in the present field of art can be used. This can be achieved by incorporating the above tonal conversion formula in a color separation and halftone system such as a commercial electronic color separation apparatus (e.g., color scanner or total scanner).

Specifically, a small-diameter beam of light is irradiated onto an original picture which is a continuous tone picture. Its reflected light or transmitted light (video information signal) is received by a phototube (photomultiplier), whereby the intensity of the light is converted into a corresponding voltage. Electrical video information signals obtained in the above manner (electrical values) are straightened up and processed as desired by a computer. An exposing light source is controlled on the basis of the electrical video information signals (voltages) outputted from the computer. A raw stock is then exposed to a beam of light to form dots, so that an original printing plate is produced. These procedures are carried out by a well-known conventional system. It is only necessary to incorporate a software, which has been designed to process continuous-tone electrical video information signals into halftone electrical video information signals by using the above tonal conversion formula, in the conventional system, for example, in a computing unit of a computer, the computing unit being adapted to straighten up and process video information of an original picture and/or electrical video information signals.

An original printing plate containing a halftone picture in which the halftone dot percentage of a sample point (Y) is equal to a dot area percentage (y) obtained in accordance with the above tonal conversion formula can be easily obtained if a beam of photoelectric scanning light is caused to advance in spots and an exposing unit is operated in synchronization with the scanning unit.

The above tonal conversion formula is useful not only for the formation of pictures by printing but also for ink jet recording, thermal transfer recording (fusion-transfer type thermal transfer, sublimable pigment thermal transfer), digital copying and recording, etc. Namely, the above-described tonal conversion formula can be used to control recording units in sublimable color pigment transfer recording which expresses the tone of a reproduced picture by changing the density of small pixels themselves; in printing, ink jet recording and fusion-transfer type thermal transfer recording which express the tone of a reproduced picture by changing the size of halftone dots, namely, the coverage by pixels; and in digital copying, ink jet recording and fusion-transfer type thermal transfer recording which express the tone of a reproduced picture by changing the pixel coverage, for example, by changing the arrangement and/or population of dots having a constant size.

The present inventors have found that the tone control technique for pictures reproduced by these minute pixels, especially, reproduced color pictures can also be used for the tonal control of a color television receiver which reproduces color pictures with minute pixels by producing the three primary colors of light, namely, red, green and blue colors. The above finding has led to the provision of the picture processing method of this invention for color television receivers and to the processor therefor.

The individual variables of the above tonal conversion formula applied to reproduced pictures such as printed pictures correspond to the following values in color televisions.

Namely, x in the above tonal conversion formula corresponds to the value of the base luminance signal of a desired pixel (one of the whole pixels, i.e., 367,500 pixels on a color picture tube), specifically, to the value $e_p$ of a luminance signal obtained by subtracting the value $e_{ys}$ of uncorrected luminance signal for a shadow S of a picture from the value $e_y$ of uncorrected luminance signal of a desired pixel P of the same picture.

On the other hand, y corresponds to the value $e_q$ of a corrected luminance signal for a pixel Q on a color picture tube (i.e., in a picture under scanning), the pixel Q corresponding to the above pixel P.

$y_h$ corresponds to the value $e_s$ of a luminance signal set for the shadow S out of the pixels on the color picture tube, while $y_s$ corresponds to the value $e_h$ of a luminance signal set for the highlight H out of the pixels on the color picture tube.

k, $\alpha$ and $\beta$ are factors which are concerned with contrast adjustment of a reproduced picture. Incidentally, the factor $\alpha$ may be set at 1, but other values can also be used equally.

When the above-described tonal conversion formula is rewritten on the basis of these correlations for pictures to be reproduced on a color television screen, the following correction formula can be obtained.

$$e_q = e_s + \frac{(1 - 10^{-ke_p})}{\alpha - \beta}(e_h - e_s)$$

wherein the variables have the same meanings as defined above except that the factor $\alpha$ has been set at 1.

Figure 7A:
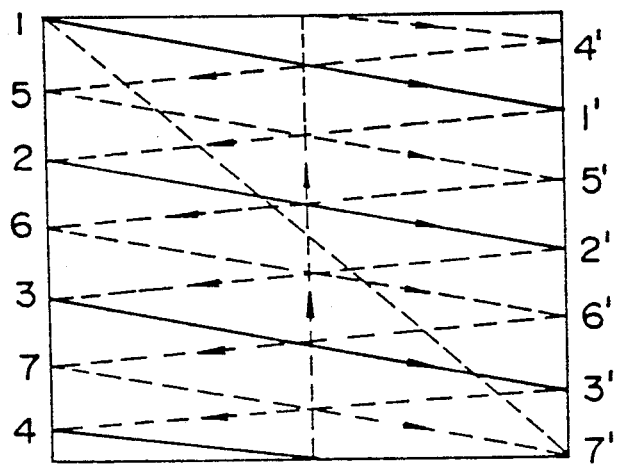
FIGS. 7(a) and 7(b) are scanning patterns, which illustrate how a complete picture is formed.
Figure 7B:
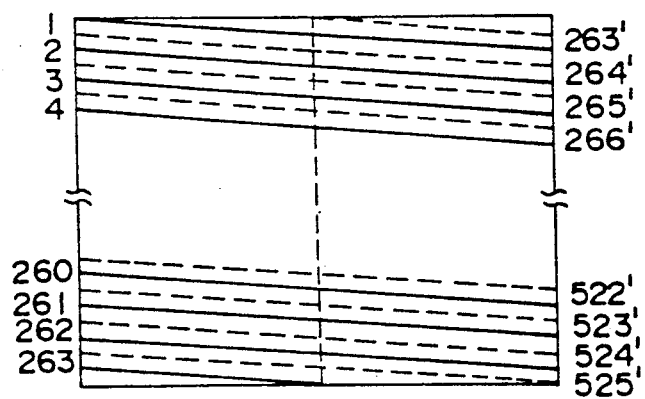

As the value $e_{ys}$ of the uncorrected luminance signal for the shadow S of the picture as the object, the value $e_s$ of a luminance signal set for a shadow S to be reproduced on a color picture tube after correction and the value $e_h$ of a luminance signal set for a highlight H to be reproduced on the color picture tube after correction, their corresponding values on the picture immediately preceding the picture under scanning, namely, the picture reproduced 1/30 second ago are used for the sake of convenience as described above with reference to FIG. 7. Needless to say, as the values $e_s$ and $e_h$, the values of the corresponding luminance signals before correction may be used or arbitrary values may be set. Incidentally, the term "before correction" as used herein means "before processing in accordance with the correction formula" while the term "after correction" means "after processing in accordance with the correction formula".

Using the value $e_q$ thus obtained for each pixel after correction, the luminance of each pixel to be reproduced on the color picture tube is adjusted instantaneously.

Accordingly, the processing method of a picture to be reproduced on a color picture tube can be performed by a picture processor which is equipped with an A/D converter for converting the luminance signals for individual pixels into digital signals, a storage circuit for luminance signals for a picture obtained from the preceding scanning operation (before correction), a detector for detecting the value $e_{ys}$ of a luminance signal for a shadow, a storage circuit for luminance signals for the picture obtained from the preceding scanning operation (after correction), a detector for detecting the value $e_h$ of a luminance signal for a highlight and the value $e_s$ of a luminance signal for a shadow after correction, a processor for computing corrected values of luminance signals by using as inputs detection signals from the detectors, a D/A converter for converting the computation results of the processor into analog signals, and a luminance control circuit for adjusting the luminances of individual pixels, which are to be reproduced on the color picture tube, in accordance with outputs from the D/A converter, respectively.

The method of this invention, which is suitable for processing a picture to be reproduced on a color picture tube, can be practiced by subtracting the value $e_{ys}$ of a luminance signal for a shadow S of a picture, which has been obtained from a preceding scanning operation, from the value $e_y$ of a luminance signal for a desired pixel P out of the video signals received, thereby determining the value $e_p$ of a base luminance signal, detecting luminance signal values $e_s$ and $e_h$ respectively for a shadow S and a highlight H among pixels of the picture to be reproduced on the color picture tube, obtaining the value $e_q$ of a luminance signal for a pixel Q, which corresponds to the pixel P and is to be reproduced, from the signal values $e_p$, $e_s$ and $e_h$ in accordance with the following correction formula:

$$e_q = e_s + \frac{\alpha(1 - 10^{-ke_p})}{\alpha - \beta}(e_h - e_s),$$

and adjusting the luminance for each pixel, which is to be reproduced on the color picture tube, in accordance with the value $e_q$ of the corresponding luminance signal thus determined.

Embodiments of the present invention will hereinafter be described with reference to the accompanying drawings. It should however be borne in mind that the present invention is not necessarily limited to or by the following embodiments.

In FIGS. 1(a) and 1(b), there are illustrated a color picture tube 1, a luminance signal processor 2, video signal output circuits 3,3',3'' for R, G and B colors respectively, R-Q, G-Q and B-Q modulator 4,4',4'', a third video signal amplifier 5 for performing amplification in three stages, a second video signal amplifier 6, a first video signal amplifier 7, a luminance control circuit 8 and a second bandpass amplifier 9.

The operation of the present invention as applied to the primary color drive system will next be described with reference to FIG. 1(a). A luminance signal $E_Q$ from the third video signal amplifier 5, the luminance signal corresponding to the value $e_q$ determined in accordance with the above correction formula, and primary color signals from the second bandpass amplifier 9 are processed at the R-Q modulator 4, G-Q modulator 4', and B-Q modulator 4", whereby color difference signals $E_R-E_Q$, $E_G-E_Q$ and $E_B-E_Q$ are obtained. The color difference signals are respectively added with the luminance signal at the video signal output circuits 3,3',3" as next-stage matrix circuits, thereby obtaining primary color signals $E_R,E_G,E_B$ for red, green and blue colors. These three primary color signals $E_R,E_G,E_B$ are then fed to the corresponding cathodes of the color picture tube 1.

The luminance signal received is amplified at the first video signal amplifier 7, followed by detection as a luminance signal $E_Y$ before correction. The luminance signal $E_Y$ is then fed to the next-stage second video signal amplifier 6 and also to the luminance signal processor 2.

The luminance signal $E_Y$ corresponds to the luminance of the object. An output of the third video amplifier 5 is fed back, as the luminance of the corresponding pixel to be reproduced on the color picture tube, to the luminance signal processor 2. At the luminance signal processor 2, the value $e_q$ of a corrected luminance signal for each pixel is computed in accordance with the above correction formula.

The corrected luminance signal of the value $e_q$ is applied to a base of a transistor of the second video signal amplifier 6 via the luminance control circuit 8.

This luminance control is performed to change at the same small rate voltages which are to be applied to the three cathodes of the color picture tube, respectively.

When the base voltage of the transistor of the second video signal amplifier 6 is changed, the cathode voltages of the color picture tube are changed because the second video signal amplifier 6 is connected in series to the color picture tube 1 by way of the third video amplifier 5. As a result, the luminance of each pixel on the color picture tube 1 can be adjusted.

Operations of the remaining circuits are the same as the conventional operations and their description is therefore omitted herein.

Figure 2:
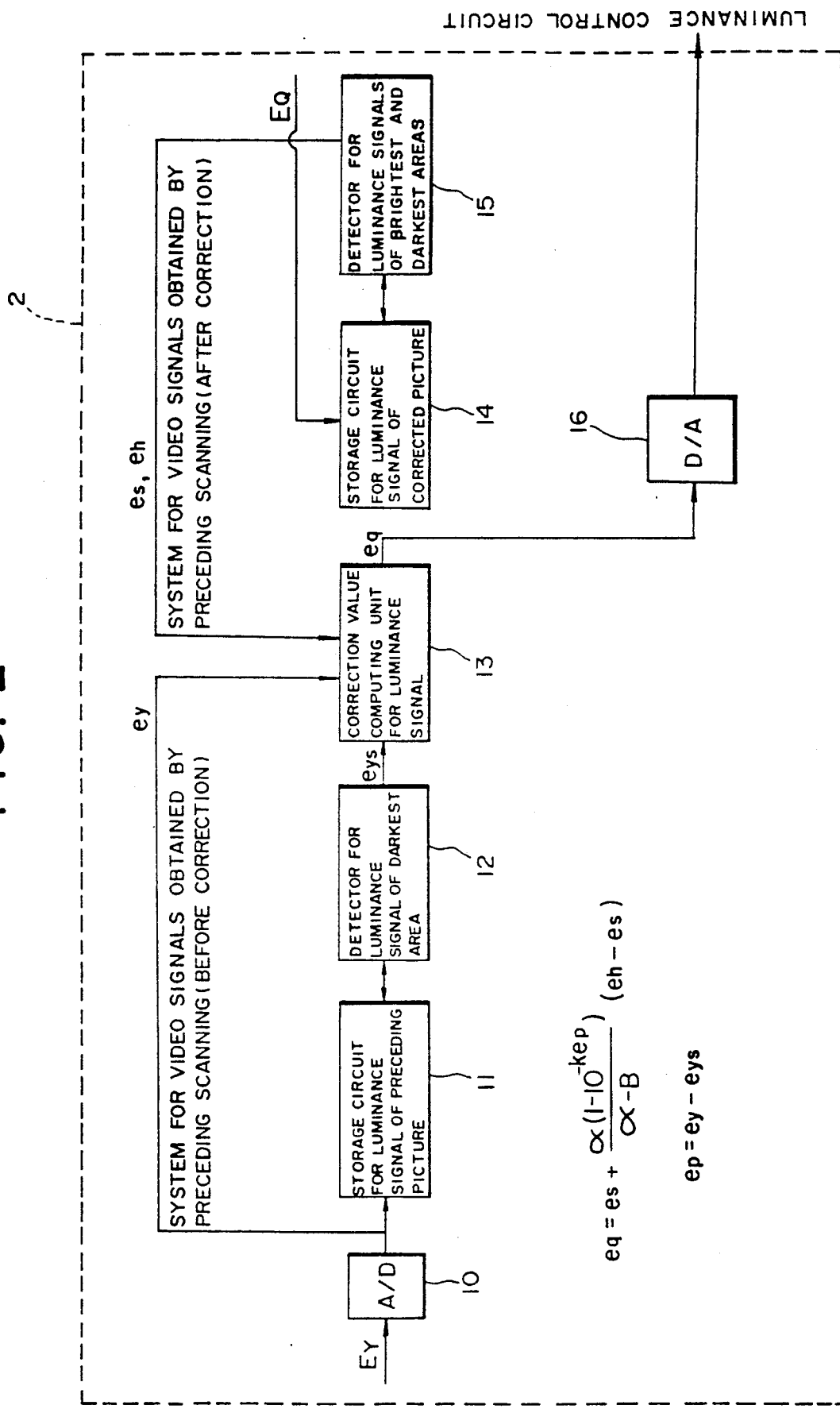
FIG. 2 is a detailed block diagram of a luminance signal processor shown in FIG. 1(a) or FIG. 1(b)
Figure 3:
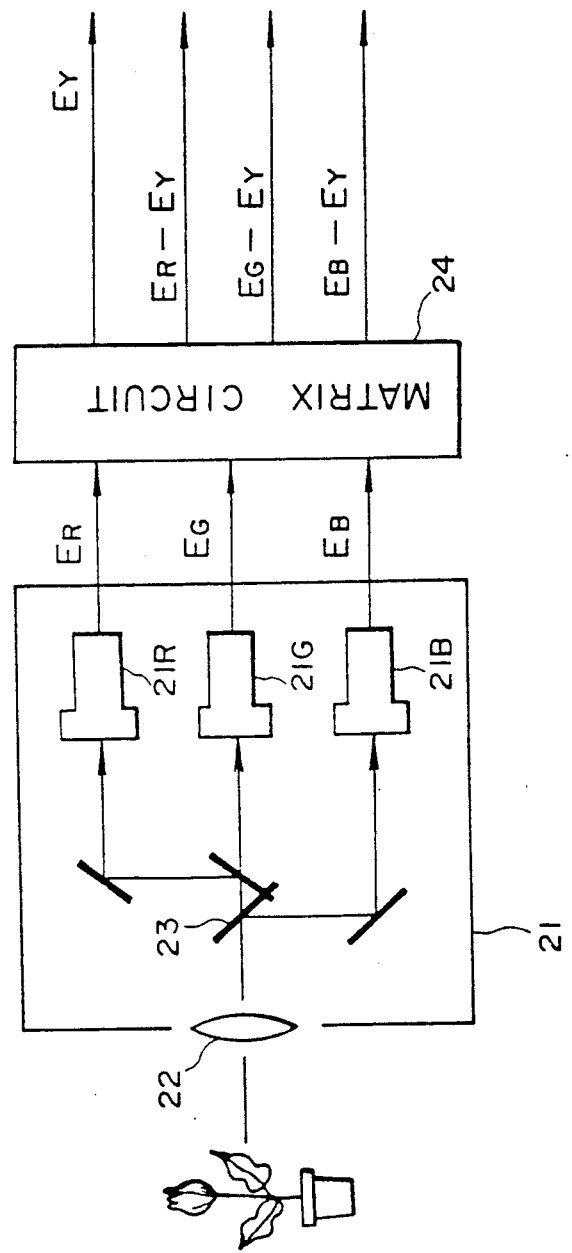
FIG. 3 is a simplified block diagram of a color television transmitter.
Figure 4:
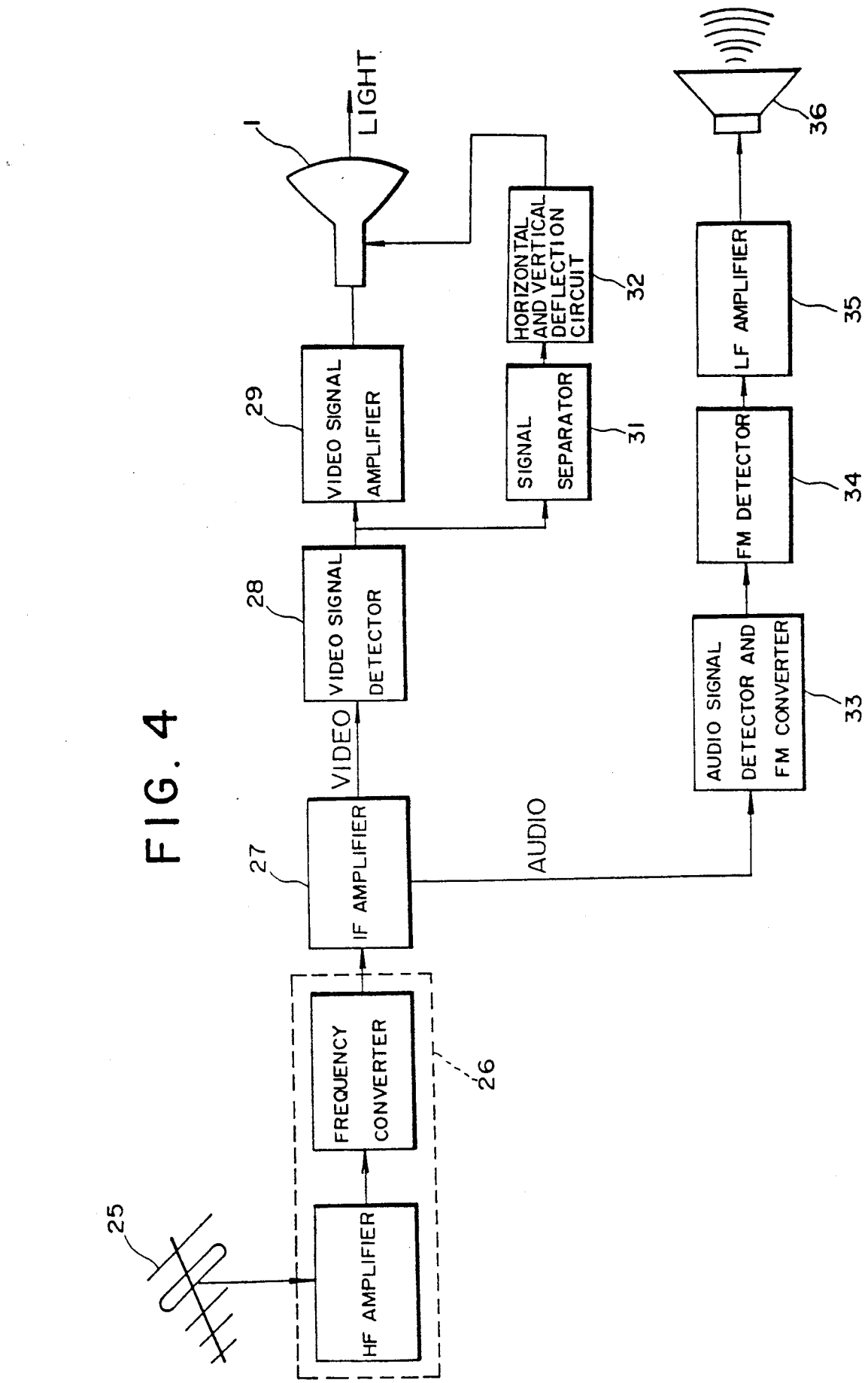
FIG. 4 is a block diagram of a color television receiver.
Figure 5:
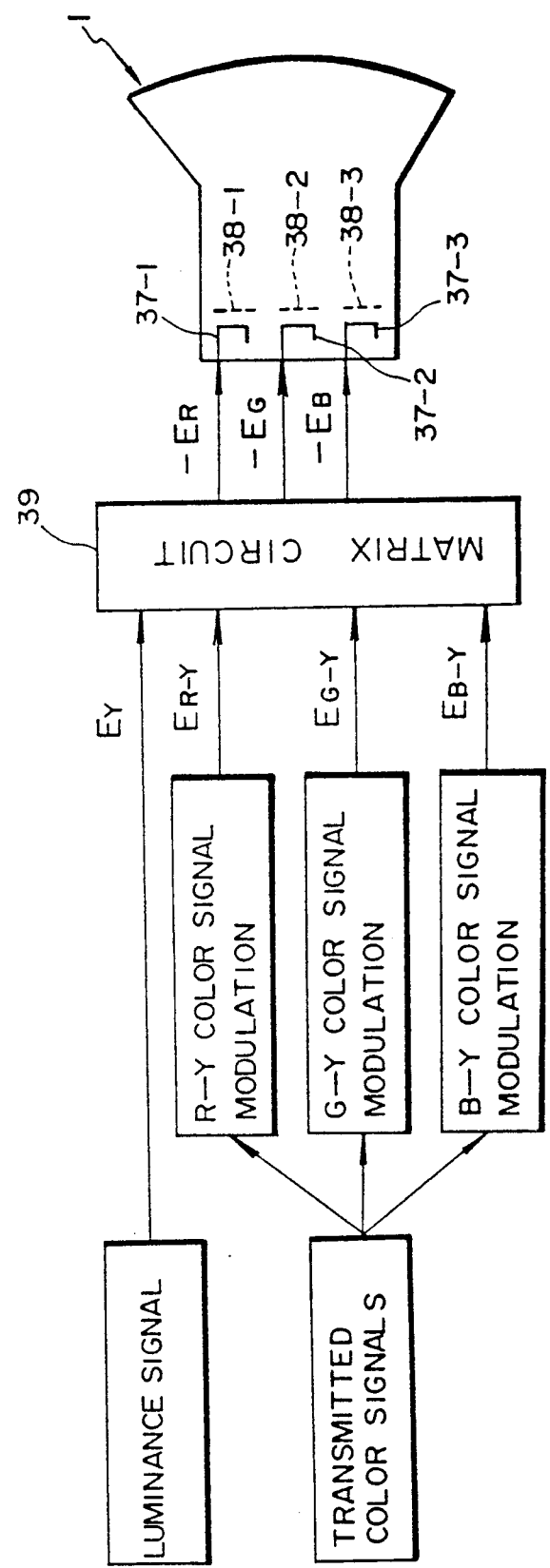
FIG. 5 is a simplified block diagram of a color television receiver of the primary color drive system.
Figure 6:
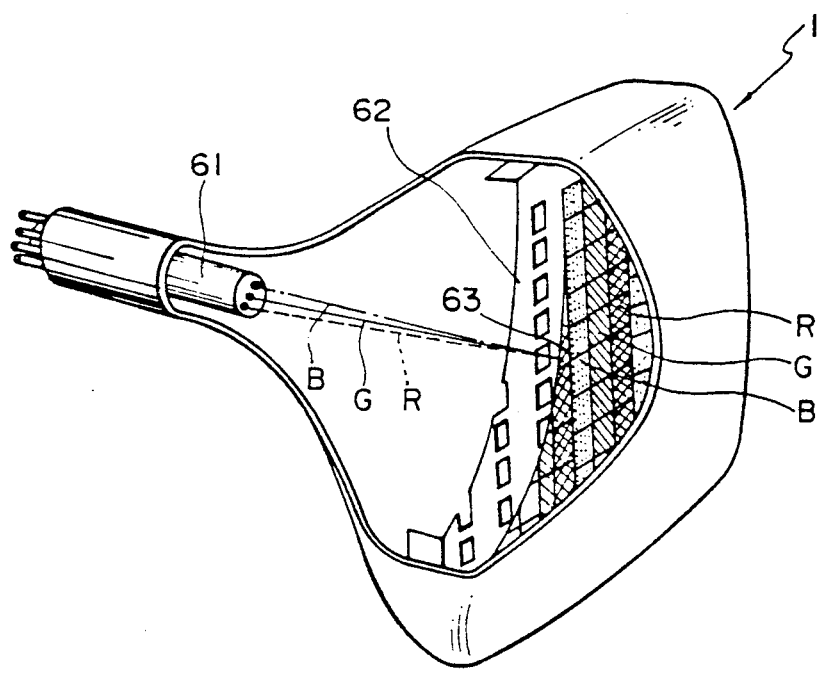
FIG. 6 is a partly-cutaway perspective view of a shadow mask tube, showing its basic structure.

The luminance signal processor 2 will next be described in further detail with reference to FIG. 2, in which there are illustrated an A/D converter 10 for converting analog signals into digital signals, a storage circuit 11 for the luminance signals for the individual pixels of a picture obtained from the preceding scanning operation, a detector 12 for detecting the value $e_{ys}$ of a luminance signal for a shadow out of the contents stored in the storage circuit 11 and for outputting it to the next-stage device, and a processor 13 for correcting luminance signals in accordance with the correction formula. The processor 13 is composed of plural CPUs to perform parallel processing. Also illustrated are a storage circuit 14 for corrected luminance signals for the individual pixels of the picture obtained from the preceding scanning operation, said the picture having been corrected during the preceding scanning operation, a detector 15 for detecting the value $e_h$ of a luminance signal for a highlight and the value $e_s$ of a luminance signal for a shadow out of the contents stored in the storage circuit 14, and a D/A converter 16 for converting digital signals into analog signals.

Uncorrected luminance signals $E_Y$, which have been received and vary from one pixel to another, are detected by the first video signal amplifier 7 and are then digitized at the A/D converter 10 into signals $e_y$. They are tentatively stored in the storage circuit 11, and at the same time are fed to the processor 13. Since the processor 13 is composed of the plural CPUs connected in parallel and performs parallel processing, the luminance signals for the individual pixels can be processed promptly. As soon as one scanning operation is completed and a complete picture is formed, the luminance signal of the value $e_{ys}$ for the shadow in the picture is detected by the detector 12 and is then outputted to the processor 13. The corrected luminance signal $e_q$ obtained from the preceding scanning operation and processed at the processor 13 is stored in the storage circuit 14. Then, the corrected luminance signals $e_h,e_s$ for the highlight and shadow of the picture obtained from the preceding scanning operation are immediately detected at the detector 15 and fed back to the processor 13.

At the processor 13, the value of the uncorrected luminance signal for the shadow S in the picture obtained from the preceding scanning operation is subtracted from the value $e_y$ of the luminance signal for a desired pixel P out of the video signals received, whereby a luminance signal value $e_p$ is determined. Further, a corrected value for the luminance signal $e_q$ is computed at a high speed from the values $e_h,e_s$ of the luminance signals for the highlight and shadow, which have been corrected and fed back, in accordance with the following correction formula:

$$e_q = e_s + \frac{(1 - 10^{-ke_p})}{\alpha - \beta} (e_h - e_s)$$

The value $e_q$ thus obtained is the value of a corrected luminance signal for each pixel.

To use the value $e_q$ of the thus-corrected luminance signal as a datum for the next scanning operation, the corrected luminance signal is fed to the next storage circuit 11 and is also converted into an analog signal at the D/A converter 16. The analog signal is thereafter fed as a base voltage to the transistor of the second video signal amplifier 6, so that the cathode voltages to the color picture tube 1 are changed to adjust the values of the luminance signals of individual pixels, which are to be reproduced on the color picture tube, to the corrected values. As a visually natural result, a color picture having a gradation and good definition can be obtained on the color picture tube.

In the above embodiment, the primary color drive system is employed as a method for feeding primary color signals to the color picture tube. Needless to say, this invention is however not limited to the above embodiment. As illustrated in FIG. 1(b), it can also be applied to the color difference drive system. In the embodiment of FIG. 1(b), it is necessary to feed a corrected luminance signal $E_Q$ to the respective cathodes of the color picture tube and color difference signals $E_R-E_Q,E_G-E_Q,E_B-E_Q$ to the corresponding first grids through the corresponding amplifiers. The remaining signal processing is substantially the same as the primary color drive system depicted in FIG. 1.

What is claimed is:

1. A method for processing a first picture to be reproduced on a color picture tube, which comprises:
   (i) subtracting a value $e_{ys}$ of a luminance signal for a shadow S of a second picture, which has been obtained from a preceding scanning operation, from a value $e_y$ of a luminance signal for a desired pixel P out of video signals received, to thereby determine a value $e_p$ of a base luminance signal;

(ii) setting luminance signal values $e_s$ and $e_h$ respectively for a shadow S and a highlight H among pixels of the first picture to be reproduced on the color picture tube;

(iii) determining a value $e_q$ of a luminance signal for the pixel P from the signal values $e_p$, $e_s$ and $e_h$ in accordance with the following correction formula:

$$e_q = e_s + \frac{\alpha(1 - 10^{-ke_p})}{\alpha - \beta}(e_h - e_s)$$

wherein k, $\alpha$ and $\beta$ are factors for contrast adjustment and k and $\beta$ are correlated as follows:

$K = \gamma/(e_h - e_s)$ $\beta = 10^{-\gamma}$ $\gamma$ = desired factor; and (iv) adjusting the luminance for each pixel, which is to be reproduced on the color picture tube, in accordance with the value $e_q$ of the corresponding luminance signal thus determined.

2. The method as claimed in claim 1, wherein the luminance signal value $e_s$ for the shadow S and the luminance signal value $e_h$ for the highlight H are detected and set from the luminance value of pixels in the second picture obtained from the preceding scanning operation and reproduced on the color picture tube.

3. The method as claimed in claim 1, wherein the luminance signal value $e_s$ for the shadow S and the luminance signal value $e_h$ for the highlight H are detected and set from the luminance values of pixels in the second picture, which has been obtained from the preceding scanning operation.

4. The method as claimed in claim 1, wherein the luminance signal value $e_s$ for the shadow S and the luminance signal value $e_h$ for the highlight H are set in an arbitrary manner.

5. A picture signal processor for a picture reproduction apparatus of a color television receiver, said picture reproduction apparatus having a color picture tube, a matrix circuit for detecting a primary color signal from a second luminance signal and a color difference signal and a means for feeding an output from the matrix circuit to the color picture tube, comprising:

a luminance signal processor for computing the value of the second luminance signal for a pixel Q which corresponds to a desired pixel P out of video signals received and is to be reproduced; and a luminance control circuit for adjusting, in accordance with the thus-computed value, the luminance of a first luminance signal of a corresponding pixel to be reproduced on the color picture tube to obtain the second luminance signal;

wherein the luminance signal processor comprises:

an A/D converter for converting the first luminance signal;

a first storage circuit for storing luminance signals of individual pixels of a picture obtained from a preceding scanning operation;

a first detector for detecting a value $e_{ys}$ of a luminance signal for a shadow in contents stored in the first storage circuit;

a second storage circuit for storing corrected luminance signals of the individual pixels of the picture obtained from the preceding scanning operation, said corrected luminance signals having been fed subsequent to processing thereof;

a second detector for detecting a value $e_h$ of a luminance signal for a highlight and a value $e_s$ of a luminance signal for a shadow stored in the second storage circuit;

a processor for subtracting the value $e_{ys}$ of the luminance signal from the value $e_y$ of a luminance signal received from a desired received pixel P, to thereby compute a value $e_p$ of a base luminance signal, and then for computing a value $e_q$ of a luminance signal for the desired pixel P, in accordance with the following correction formula:

$$e_q = e_s + \frac{\alpha(1 - 10^{-ke_p})}{\alpha - \beta}(e_h - e_s)$$

wherein k, $\alpha$ and $\beta$ are factors for contrast adjustment and k and $\beta$ are correlated as follows:

$K = \gamma(e_h - e_s)$ $\beta = 10^{-\gamma}$ $\gamma$ = desired factor and is to be reproduced; and a D/A converter for converting the value $e_q$, which has been outputted from the processor, into an analog signal.

* * * * *